United States Patent
Onishi et al.

(10) Patent No.: US 9,549,137 B2
(45) Date of Patent: Jan. 17, 2017

(54) DRIVING METHOD FOR IMAGING APPARATUS, IMAGING APPARATUS, AND IMAGING SYSTEM

(71) Applicant: CANON KABUSHIKI KAISHA, Tokyo (JP)

(72) Inventors: Tomoya Onishi, Ayase (JP); Daisuke Kobayashi, Kawaguchi (JP); Takeru Ohya, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 251 days.

(21) Appl. No.: 14/286,871

(22) Filed: May 23, 2014

(65) Prior Publication Data

US 2014/0354864 A1 Dec. 4, 2014

(30) Foreign Application Priority Data

May 28, 2013 (JP) .................. 2013-111840

(51) Int. Cl.
*H04N 5/376* (2011.01)
*H04N 5/3745* (2011.01)

(52) U.S. Cl.
CPC ........ *H04N 5/3765* (2013.01); *H04N 5/37455* (2013.01)

(58) Field of Classification Search
CPC H04N 5/3765; H04N 5/37455; H04N 5/3355; H04N 5/3745; H04N 5/378; H04N 341/155; H03M 1/00
See application file for complete search history.

(56) References Cited

U.S. PATENT DOCUMENTS

| | | | | |
|---|---|---|---|---|
| 2006/0284999 A1* | 12/2006 | Muramatsu | ............ | H04N 3/155 348/308 |
| 2013/0107092 A1* | 5/2013 | Minami | ................. | H04N 5/32 348/301 |
| 2013/0258151 A1* | 10/2013 | Ayers | ................. | H04N 5/3575 348/302 |

FOREIGN PATENT DOCUMENTS

JP 2006-203736 A1 8/2006

* cited by examiner

*Primary Examiner* — Mekonnen Dagnew
(74) *Attorney, Agent, or Firm* — Canon USA, Inc. IP Division

(57) ABSTRACT

There is provided an imaging apparatus including an A/D converting unit, wherein reset periods for a plurality of pixels are differentiated.

18 Claims, 10 Drawing Sheets

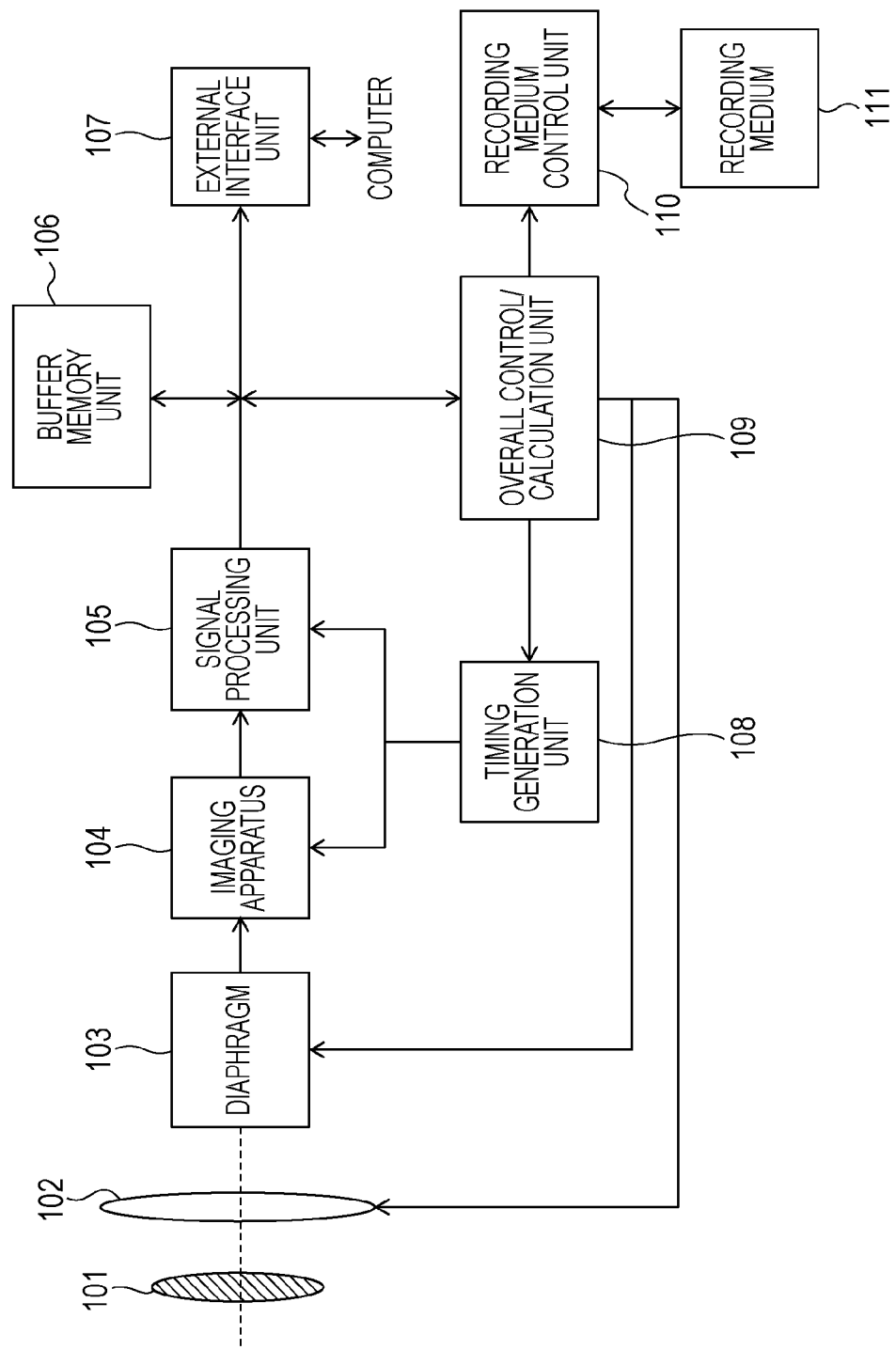

DRIVING METHOD FOR IMAGING APPARATUS, IMAGING APPARATUS, AND IMAGING SYSTEM

BACKGROUND OF THE INVENTION

Field of the Invention

One disclosed aspect of the embodiments relates to an imaging apparatus and an imaging system including pixels each having a converting unit configured to generate a signal based on an incident electromagnetic wave and an analog/digital converting unit configured to convert a signal generated by the converting unit to a digital signal.

Description of the Related Art

An imaging apparatus has been known which includes pixels each having a converting unit configured to generate a signal based on an incident electromagnetic wave and an analog/digital converting unit (hereinafter, called an A/D converting unit) configured to convert a signal generated by the converting unit to a digital signal, as disclosed in Japanese Patent Laid-Open No. 2006-203736.

SUMMARY OF THE INVENTION

According to an aspect of the embodiments, there is provided an imaging apparatus including a plurality of pixels including at least a first pixel and a second pixel, the first pixel and the second pixel each having a converting unit configured to generate an electric signal based on an incident electromagnetic wave, an input unit configured to receive the electric signal from the converting unit, a reference signal input unit configured to receive a reference signal, and an A/D converting unit configured to convert the electric signal to a digital signal based on a result of comparison between a potential of the input unit and a potential of the reference signal input unit, wherein a reset period for resetting at least one of a potential of the converting unit, a potential of the input unit, and a potential of the reference signal input unit is started for the first pixel and the second pixel at different timing from each other, and timing for inputting the electric signal from the converting unit to the input unit is synchronized between the first pixel and the second pixel.

According to another aspect of the embodiments, there is provided an imaging apparatus including a plurality of pixels including at least a first pixel and a second pixel, the first pixel and the second pixel each having a converting unit configured to generate an electric signal based on an incident electromagnetic wave, an input unit configured to receive the electric signal from the converting unit, a reference signal input unit configured to receive a reference signal, and an A/D converting unit configured to convert the electric signal to a digital signal based on a result of comparison between a potential of the input unit and a potential of the reference signal input unit, and a potential supply unit configured to supply a common reset potential to the plurality of pixels, a first electrical path configured to supply the reset potential to the first pixel from the potential supply unit, and a second electrical path configured to supply the reset potential to the second pixel from the potential supply unit, the second electrical path being longer than the first electrical path, wherein a reset period for resetting at least one of a potential of the converting unit, a potential of the input unit, and a potential of the reference signal input unit is started for the second pixel earlier than the first pixel.

According to another aspect of the embodiments, there is provided an imaging apparatus including a plurality of pixels including at least a first pixel and a second pixel, the first pixel and the second pixel each having a converting unit configured to generate an electric signal based on an incident electromagnetic wave, an input unit configured to receive the electric signal, a reference signal input unit configured to receive a reference signal, and an A/D converting unit configured to convert the electric signal to a digital signal based on a result of comparison between a potential of the input unit and a potential of the reference signal input unit, and a potential supply unit configured to supply a common reset potential to the plurality of pixels, a first electrical path configured to supply the reset potential to the first pixel from the potential supply unit, and a second electrical path configured to supply the reset potential to the second pixel from the potential supply unit, a resistance of the second electrical path being larger than a resistance of the first electrical path, wherein a reset period for resetting at least one of a potential of the converting unit, a potential of the input unit, and a potential of the reference signal input unit is started for the second pixel earlier than the first pixel.

According to another aspect, there is provided an imaging apparatus including a plurality of pixels including at least a first pixel and a second pixel, the first pixel and the second pixel each having a converting unit configured to generate an electric signal based on an incident electromagnetic wave, an input unit configured to receive the electric signal from the converting unit, a reference signal input unit configured to receive a reference signal, and an A/D converting unit configured to convert the electric signal to a digital signal based on a result of comparison between a potential of the input unit and a potential of the reference signal input unit, and a control unit configured to differentiate timing for starting a reset period for resetting at least one of a potential of the converting unit, a potential of the input unit, and a potential of the reference signal input unit between the first pixel and the second pixel from each other and synchronize timing for inputting the electric signal from the converting unit to the input unit between the first pixel and the second pixel.

According to another aspect of the embodiments, there is provided an imaging apparatus including a plurality of pixels including at least a first pixel and a second pixel, the first pixel and the second pixel each having a converting unit configured to generate an electric signal based on an incident electromagnetic wave, an input unit configured to receive the electric signal from the converting unit, a reference signal input unit configured to receive a reference signal, and an A/D converting unit configured to convert the electric signal to a digital signal based on a result of comparison between a potential of the input unit and a potential of the reference signal input unit, a potential supply unit configured to supply a common reset potential to the plurality of pixels, a first electrical path configured to supply the reset potential to the first pixel from the potential supply unit, and a second electrical path configured to supply the reset potential to the second pixel from the potential supply unit, the second electrical path being longer than the first electrical path, and a signal supply unit configured to start a reset period for supplying a reset potential to at least one of the converting unit, the input unit, and the reference signal input unit for the second pixel earlier than the first pixel.

According to another aspect of the embodiments, there is provided an imaging apparatus including a plurality of pixels including at least a first pixel and a second pixel, the first pixel and the second pixel each having a converting unit configured to generate an electric signal based on an incident electromagnetic wave, an input unit configured to receive the electric signal, a reference signal input unit configured to receive a reference signal, and an A/D converting unit configured to convert the electric signal to a digital signal based on a result of comparison between a potential of the input unit and a potential of the reference signal input unit, a potential supply unit configured to supply a common reset potential to the plurality of pixels, an first electrical path configured to supply the reset potential to the first pixel from the potential supply unit, a second electrical path configured to supply the reset potential to the second pixel from the potential supply unit, the second electrical path being longer than the first electrical path, and a signal supply unit configured to start a reset period for supplying a reset potential to at least one of the converting unit, the input unit, and the reference signal input unit for the second pixel earlier than the first pixel.

Further features of the disclosure will become apparent from the following description of exemplary embodiments with reference to the attached drawings.

BRIEF DESCRIPTION OF THE DRAWINGS

FIG. 10 is a schematic diagram illustrating an example of an imaging system.

DESCRIPTION OF THE EMBODIMENTS

Figure 1A:
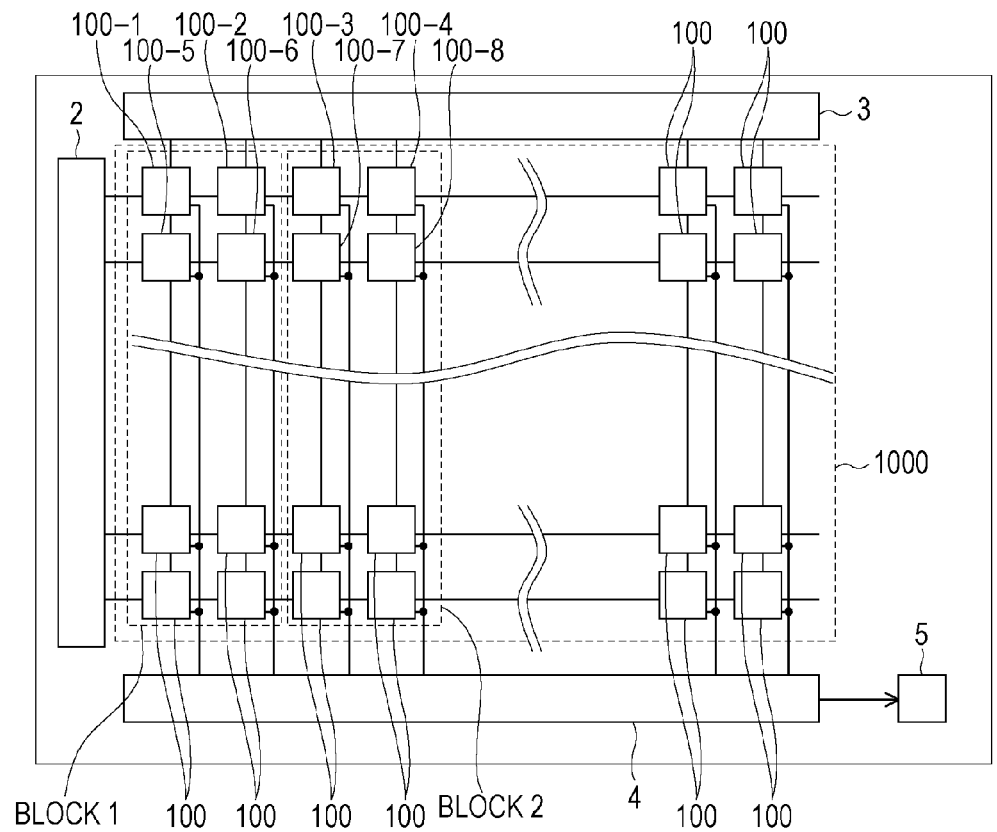
FIGS. 1A and 1B include a schematic diagram illustrating an example of a configuration of an imaging apparatus and a schematic diagram illustrating examples of configurations of a signal supplying unit and a pixel.

Japanese Patent Laid-Open No. 2006-203736 discloses an imaging apparatus in which a potential of a converting unit is reset before the converting unit generates a signal based on incident light. When a signal is reset in the converting unit, current is fed from the converting unit to a power supply line configured to supply a power supply voltage VDD. Before A/D conversion is performed, a potential of an input node of an A/D converting unit to which a signal of the converting unit is supplied is reset. Also when the input node of the A/D converting unit is reset, current is fed from the input node of the A/D converting unit to the power supply line which supplies the power supply voltage VDD. The feeding of current to the power supply line which supplies the power supply voltage VDD may cause a voltage drop, resulting in fluctuations of the potential of the power supply voltage VDD. The potential of the power supply voltage VDD fluctuates significantly in particular when a reset operation is performed on a plurality of pixels simultaneously. The fluctuations of the potential of the power supply voltage VDD may cause fluctuations of the reset voltage for the converting unit or the reset voltage for the input node of the A/D converting unit. The fluctuations of the reset voltage for the converting unit may deteriorate accuracy of a signal generated by the converting unit based on incident light. The fluctuations of the reset voltage for the input node of the A/D converting unit may deteriorate accuracy of A/D conversion. In a case where the A/D converting unit has a comparing unit configured to compare a ramp signal and a signal output from the converting unit, when a node of the comparing unit to which a ramp signal is supplied is reset, current is fed from the node to which a ramp signal is supplied to a power supply line which supplies a power supply voltage VDD. This may cause a voltage drop in the power supply line which supplies the power supply voltage VDD, resulting in fluctuations of the potential of the power supply voltage VDD. The fluctuations of the potential of the power supply voltage VDD may cause fluctuations of reset voltage for the node to which a ramp signal is supplied, which may deteriorate accuracy of A/D conversion.

The imaging apparatus disclosed in Japanese Patent Laid-Open No. 2006-203736 has not considered reduction of fluctuations of reset voltage generated by reset operations on pixels.

Exemplary embodiments which will be described below relate to a technology that may solve the problem. One disclosed feature of the embodiments may be described as a process which is usually depicted as a timing chart or timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

First Exemplary Embodiment

An imaging apparatus according to a first exemplary embodiment will be described with reference to drawings.

FIG. 1A is a block diagram illustrating an example of an imaging apparatus according to this exemplary embodiment. A pixel array 1000 has a plurality of pixels 100 arranged in a matrix form. Branch numbers 100-1 to 100-4 are given to pixels 100 included in a block 1 and a block 2 in order from the first column to the fourth column, viewed from the vertical scanning circuit 2, on the first row, viewed from the signal supplying unit 3. The expression "Mth row" (where M is an integer equal to or greater than 1) of pixels 100 is viewed from the signal supplying unit 3 hereinafter. The simple expression "Nth column" (where N is an integer equal to or greater than 1) of pixels 100 is viewed from the vertical scanning circuit 2 hereinafter. Reference numerals 100-5 to 100-8 are given to pixels in the second row of the pixels 100 included in the block 1 in order from the first to fourth columns, like the pixels 100 in the first row. The vertical scanning circuit 2 selects a row of pixels 100. The signal supplying unit 3 supplies a clock signal CLK, a ramp signal RAMP, a signal PRES, and a signal RRES to the pixels 100.

Digital signals output from the pixels 100 are supplied to the horizontal scanning circuit 4. The horizontal scanning circuit 4 outputs the digital signals output from the pixels 100 in columns sequentially to an external output unit 5.

The pixels 100-1, 100-2, 100-5, and 100-6 belong to the block 1. The signal supplying unit 3 outputs a common signal PRES_1 to the pixels 100 belonging to the block 1. The signal supplying unit 3 outputs a common signal RRES_1 to the pixels 100 belonging to the block 1. The pixels 100-3, 100-4, 100-7, and 100-8 belong to the block 2. The signal supplying unit 3 outputs a common signal PRES_2 to the pixels 100 belonging to the block 2. The signal supplying unit 3 outputs a common signal RRES_2 to the pixels 100 belonging to the block 2.

The block 1 includes a pixel corresponding to the first pixel according to the claims. And the block 2 includes a pixel corresponding to the second pixel according to the claims. The pixels 100-1 and 100-2 in the block 1 are electrically connected to the signal supplying unit 3 via different signal lines from each other, but the signal supplying unit 3 supplies common signals PRES_1 and RRES_1 to the pixels 100-1 and 100-2, according to this exemplary embodiment.

Figure 1B:
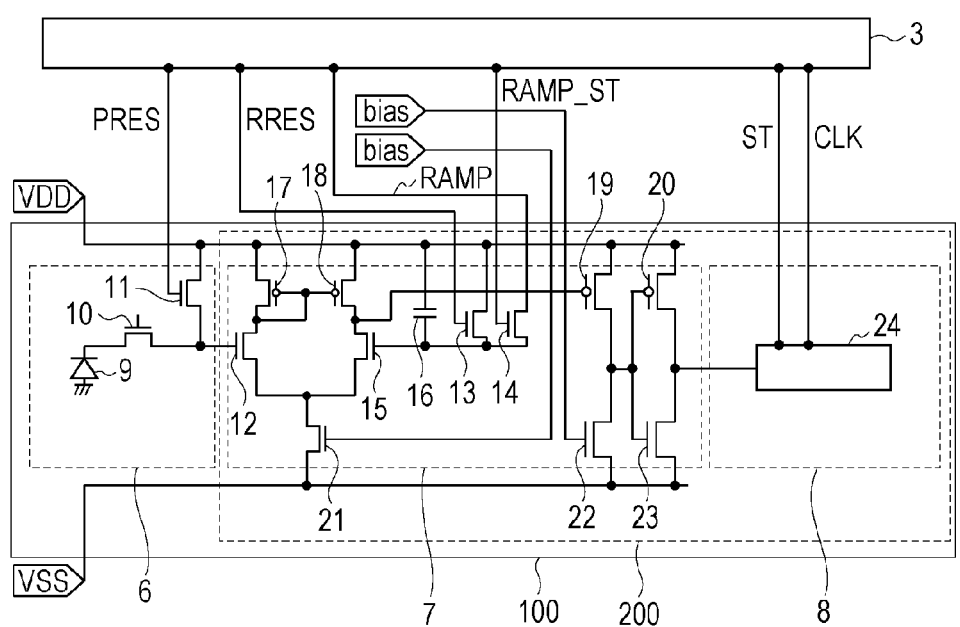

FIG. 1B is a schematic diagram illustrating an example of the pixels 100 according to this exemplary embodiment. The analog signal output unit 6 includes a photoelectric conversion unit 9, a transistor 10, and a transistor 11. The vertical scanning circuit 2 supplies a signal PTX to a control node of the transistor 10. When the vertical scanning circuit 2 changes the signal PTX to a High level (hereinafter called an H level while a Low level will be called an L level similarly), the transistor 10 transfers an electric signal generated by the photoelectric conversion unit 9 to an input node of the transistor 12. The input node of the transistor 12 corresponds to an input unit of an A/D converting unit according to the claims. The signal supplying unit 3 changes the signal PRES to an H level, a potential of the input node of the transistor 12 is reset based on a power supply voltage VDD.

The A/D converting unit 200 includes a comparing unit 7 and a memory unit 8. The comparing unit 7 has a transistor 12, a transistor 13, and a transistor 14. The signal supplying unit 3 supplies a signal RRES to a control node of the transistor 13. When the signal supplying unit 3 changes the signal RRES to an H level, the transistor 13 is brought into a conductive state, and potentials of an input node of the transistor 15 and one node of a capacitive element 16 are reset based on the power supply voltage VDD. The signal supplying unit 3 supplies a ramp signal RAMP to one primary node of the transistor 14. The signal supplying unit 3 supplies a signal RAMP_ST to a control node of the transistor 14. When the signal supplying unit 3 changes the signal RAMP_ST to an H level, the ramp signal RAMP is supplied to the input node of the transistor 15. The ramp signal RAMP according to this exemplary embodiment corresponds to a reference signal according to the claims. The input node of the transistor 15 according to this exemplary embodiment corresponds to the reference signal input unit according to the claims.

A power supply line configured to supply the power supply voltage VDD is commonly connected to the transistors 11, 13, 17, 18, 19, and 20. A power supply voltage VSS is commonly connected to the transistor 21, 22, and 23. Power supply lines configured to supply the power supply voltages VDD and VSS are commonly connected to the pixels 100 in a plurality of blocks.

The memory unit 8 includes a counter 24. The signal supplying unit 3 supplies clock signals CLK to the counter 24. The signal supplying unit 3 supplies a signal ST to the counter 24. When the signal supplying unit 3 changes the signal ST to an H level, the counter 24 starts counting the clock signals CLK. A signal resulting from counting of the clock signals CLK by the counter 24 will be called a count signal CNT. The counter 24 further holds a count signal acquired when a signal value of a comparison result signal CMP output from the comparing unit 7 changes.

Figure 2A:
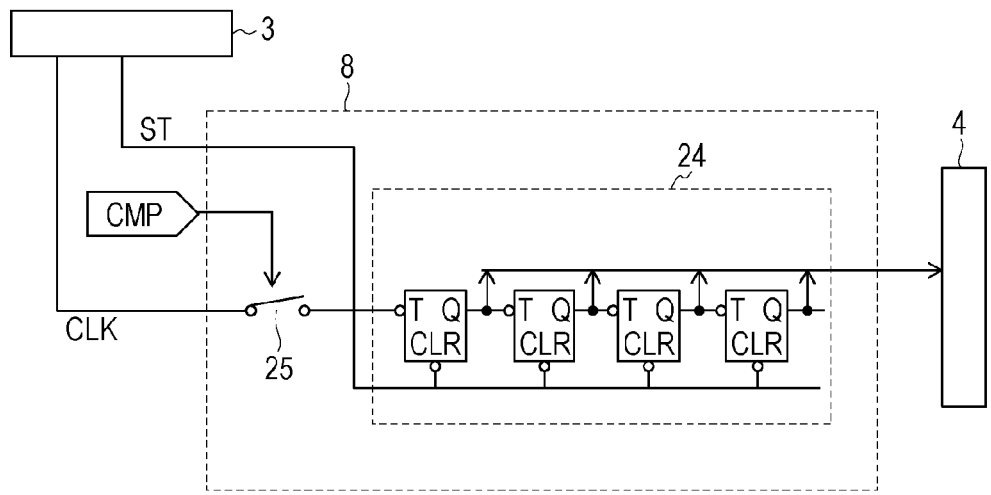
FIGS. 2A and 2B include a schematic diagram illustrating an example of a configuration of a counter and a timing chart illustrating examples of operations performed by an imaging apparatus.

FIG. 2A illustrates a configuration of the counter 24. The counter 24 has a plurality of T-type flip-flop circuits. Each of the flip-flop circuits has a reset terminal that receives the signal ST from the signal supplying unit 3. When the signal ST has an L level, the flip-flop circuits are reset. A switch 25 has a conductive state when the signal value of the comparison result signal CMP has an L level, and the clock signal CLK is input to the flip-flop circuits. The switch 25 has a non-conductive state when the signal value of the comparison result signal CMP has an H level, and the clock signal CLK is input to the flip-flop circuits. The flip-flop circuits hold signal values upon change of the switch 25 from a conductive state to a non-conductive state when the AD start signal ST has an H level. In other words, the counter 24 holds a count signal acquired when the comparison result signal CMP output from the comparing unit 7 changes its signal value.

Figure 2B:
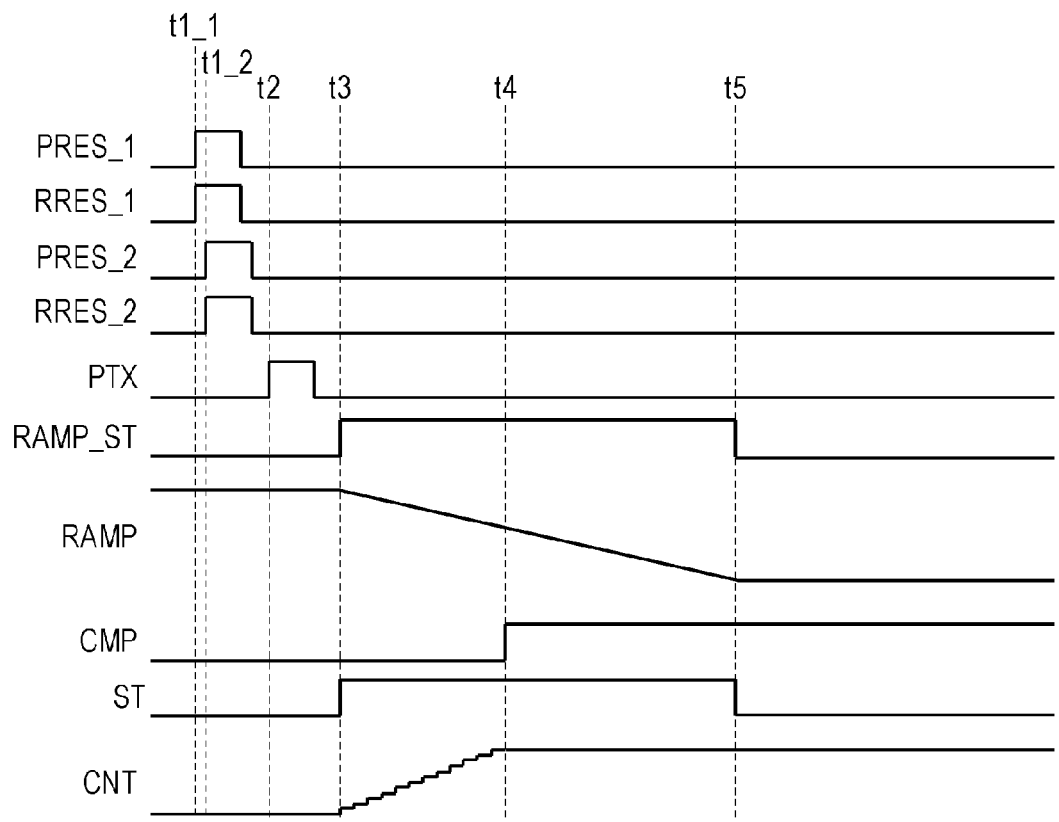

Next, operations to be performed by the pixels 100 belonging to the block 1 and block 2 in the imaging apparatus illustrated in FIG. 1A will be described with reference to FIG. 2B.

At a time t1_1, the signal supplying unit 3 changes the signal PRES_1 to be output to the pixels 100 in the block 1 to an H level to reset the potential of the input node of the transistor 12. The signal supplying unit 3 further changes the signal RRES_1 to an H level simultaneously with the change of the signal PRES_1 to an H level to initialize the potential of the capacitive element 16. After that, the signal supplying unit 3 changes the signal PRES_1 and signal RRES_1 to an L level. The time t1_1 is a starting time of a reset period for the pixels 100 belonging to the block 1.

At a time t1_2, the signal supplying unit 3 changes the signal PRES_2 to be output to the pixels 100 in the block 2 to an H level to reset the potential of the input node of the transistor 12. The signal supplying unit 3 changes the signal RRES_2 to an H level simultaneously with the change of the signal PRES_2 to an H level to initialize the potential of the capacitive element 16. After that, the signal supplying unit 3 changes the signal PRES_2 and signal RRES_2 to an L level. The time t1_2 is a starting time of a reset period for the pixels 100 belonging to the block 2.

At a time t2, the vertical scanning circuit 2 changes the signal PTX to be output to the pixels 100 in the block 1 and block 2 to an H level and then to an L level. Thus, the electric signals generated by the photoelectric conversion unit 9 are transferred to the control node of the transistor 12 simultaneously in the plurality of pixel 100.

At a time t3, the signal supplying unit 3 changes the signal RAMP_ST to be output to the pixels 100 in the block 1 and block 2 to an H level to start a change depending on time of the potential of the ramp signal RAMP to be supplied to the pixels 100 in the block 1. At the time t3, the signal supplying unit 3 changes the signal ST to be output to the pixels 100 in the blocks 1 and 2 to an H level.

For example, a case is assumed in which the magnitude relationship between the potential of the input node of the transistor 12 and the potential of the input node of the transistor 15 is reversed at a time t4. Then, the signal value of the comparison result signal CMP1 output from the comparing unit 7 is changed from an L level to an H level. The memory unit 8 holds a count signal CNT at the time t4. The pixels 100 belonging to the block 1 and block 2 hold the signal value of the count signal supplied when the signal value of the comparison result signal CMP is changed from an L level to an H level.

Here, at a time t5, the signal supplying unit 3 stops the change of the potential depending on time of the ramp signal RAMP supplied to the pixels 100 in the blocks 1 and 2. The AD conversion period for the block 1 and block 2 corresponds to a period from the time t3 to the time t5.

The horizontal scanning circuit 4 after the time t5 causes the memory units 8 in the pixels 100 to sequentially output the count signals CNT held in the memory units 8 in the pixels 100 and sequentially transfers them to the external output unit 5.

Next, with reference to FIG. 3A, reset timing for the blocks 1 to 3 illustrated in FIG. 1A will be described.

Figure 3A:
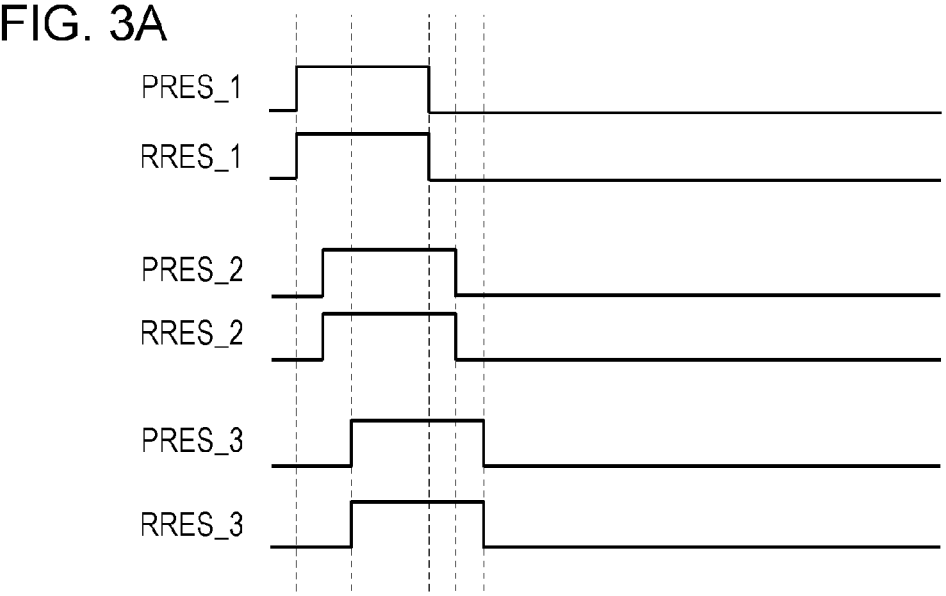
FIGS. 3A to 3C include a timing chart illustrating an example of a pixel reset operation, a schematic diagram illustrating an example of a configuration of an imaging apparatus, and a schematic diagram illustrating parasitic capacitances and parasitic resistances of power supply lines.

The signals PRES_1 and RRES_1 illustrated in FIG. 3A are output from the signal supplying unit 3 to the pixels 100 belonging to the block 1 described with reference to FIG. 1A. Similarly, the signals PRES_2 and RRES_2 are output from the signal supplying unit 3 to the pixels 100 belonging to the block 2. FIG. 3A further illustrates signals PRES_3 and RRES_3 output from the signal supplying unit 3 to pixels 100 belonging to a block 3. The block 3 is provided in a region remoter from the vertical scanning circuit 2 than the block 2 and is adjacent to the block 2 in the imaging apparatus illustrated in FIG. 1A. The block 2 is provided between the blocks 1 and 3. The signal supplying unit 3 changes the signals PRES_1 and RRES_1 to an H level simultaneously with the output of the signals PRES_1 and RRES_1 to the block 1. After that, the signals PRES_2 and RRES_2 to be output to the block 2 are changed to an H level. After that, the signals PRES_3 and RRES_3 to be output to the block 3 are changed to an H level. In other words, in the imaging apparatus of this exemplary embodiment, the timing for resetting the input node of the A/D converting unit 200 is different between the blocks. And the timing for resetting the input node for the ramp signal RAMP of the comparing unit 7 is different between blocks. On the other hand, when the signal supplying unit 3 changes the signals PRES to be output to the pixels 100 in the blocks to an H level simultaneously, current is fed from the input nodes of the A/D converting units 200 of the pixels 100 to the power supply line configured the supply a power supply voltage VDD. This may cause fluctuations of the potential of the power supply voltage VDD, resulting in fluctuations of the reset voltage to the input nodes of the A/D converting units 200. Also when the signal supplying unit 3 changes the signals RRES to be output to the pixels 100 in the blocks to an H level simultaneously, current is fed from the input nodes for the ramp signals RAMP of the comparing units 7 in the pixels 100 and the capacitive element 16 to the power supply line configured to supply the power supply voltage VDD. This may cause fluctuations of the potential of the power supply voltage VDD, resulting in fluctuations of the reset voltage to the input nodes for the ramp signal RAMP of the comparing units 7 in the pixels 100 and the capacitive element 16. This may deteriorate accuracy of A/D conversion.

The imaging apparatus according to this exemplary embodiment differentiates the timing for resetting the input nodes of the A/D converting units 200 between blocks. This allows reduction of current simultaneously fed to a power supply line configured to supply a power supply voltage VDD, compared with a case where the input nodes of the A/D converting units 200 in all blocks are reset simultaneously. This may further allow reduction of the fluctuations of the potential of the power supply voltage VDD and reduction of fluctuations of the reset voltage to the input node of the A/D converting unit 200. The timing for resetting the input node for the ramp signal RAMP of the comparing unit 7 and the capacitive element 16 is differentiated between blocks. This allows reduction of current simultaneously fed to a power supply line configured to supply a power supply voltage VDD, compared with a case where the input nodes for the ramp signal RAMP of the comparing units 7 and the capacitive elements 16 are reset simultaneously in all blocks. This may further allow reduction of fluctuations of the reset voltage to the input node for the ramp signal RAMP of the comparing unit 7 and the capacitive element 16 and reduction of accuracy of A/D conversion.

Further effectively, the imaging apparatus of this exemplary embodiment may change the signals PRES and RRES to an H level from a remotes block from a potential supply unit 300 which supplies a power supply voltage VDD. In the description above with reference to FIG. 3A, the signal supplying unit 3 sequentially changes the signals PRES and RRES to an H level in order of blocks 1, 2, and 3. Another configuration will be described below in which the signal supplying unit 3 sequentially changes the signals PRES and RRES to an H level in order of blocks 3, 2, and 1.

Figure 3B:
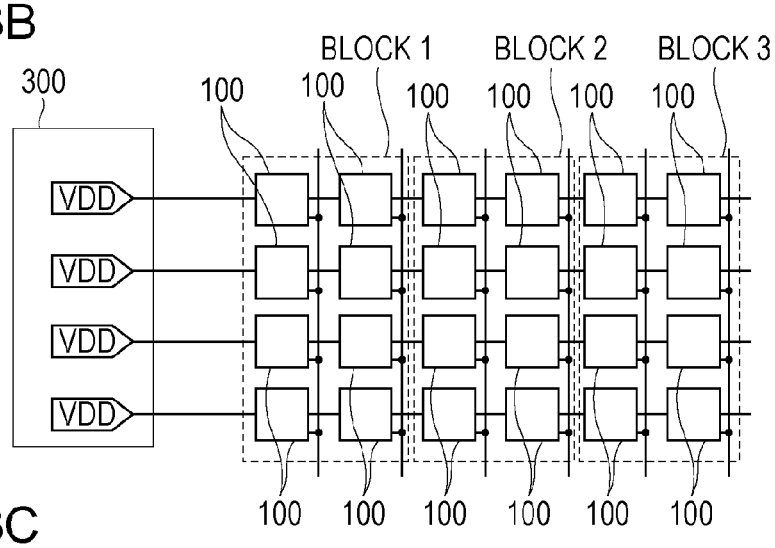

FIG. 3B illustrates both of the potential supply unit 300 configured to supply a power supply voltage VDD and the blocks of the pixels 100. The potential supply unit 300 outputs a common power supply voltage VDD to rows of the pixels 100. The blocks of the pixels 100 are disposed more remotely from the potential supply unit 300 in order of the blocks 1, 2, and 3.

Figure 3C:
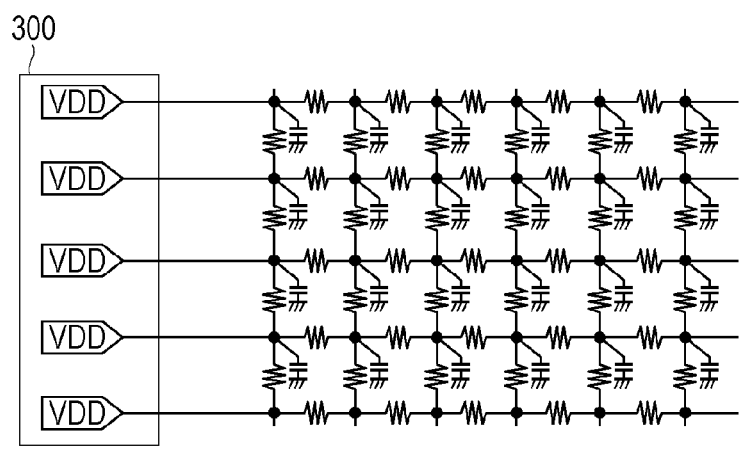

FIG. 3C illustrates parasitic resistances and parasitic capacitances in the imaging apparatus illustrated in FIG. 3B.

Focusing on resetting of the input nodes of the A/D converting units 200 first with respect to the parasitic capacitances, parasitic capacitances are provided at the input nodes of the A/D converting units 200 and nodes of the transistors 10 electrically connected to the input nodes of the A/D converting units 200. Focusing on resetting of the potentials of the input nodes of the comparing units 7, parasitic capacitances are provided at the input nodes of the comparing units 7. FIG. 3C illustrates one capacitive element which includes parasitic capacitances of the pixels 100. The signal supplying unit 3 changes the signal PRES to an H level so that current is fed from the parasitic capacitances that the pixels 100 have to the power supply line which supplies a power supply voltage VDD. The power supply line which supplies a power supply voltage VDD itself has a parasitic resistance. In the configuration illustrated in FIG. 3C, as the distance between a block and the potential supply unit 300 increases, the parasitic resistance of the power supply line which supplies a power supply voltage VDD increases.

Figure 4A:
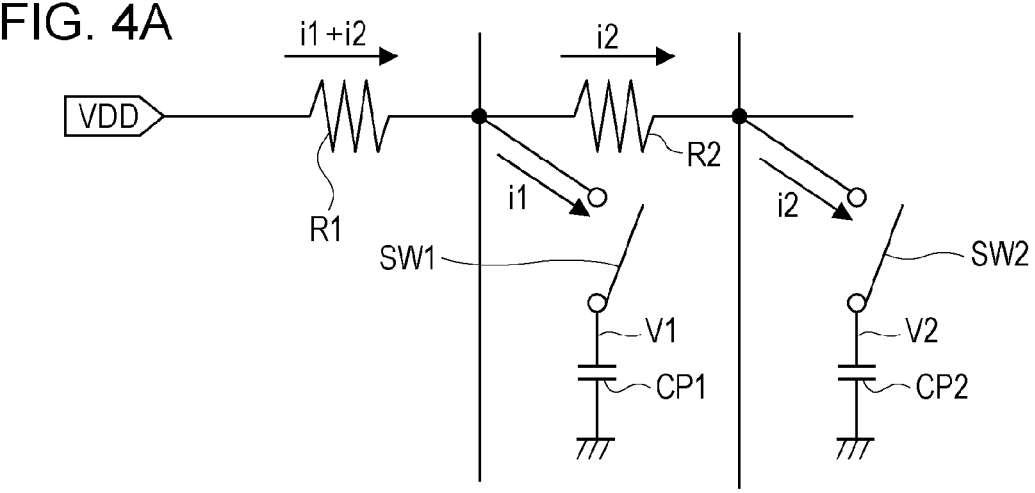
FIGS. 4A to 4C illustrate a potential and a current of a power supply line involved in a pixel reset operation.

For simplification, FIG. 4A illustrates parasitic capacitances CP1 and CP2 of two pixels 100 parasitic resistances R1 and R2 of a power supply line which supplies a power supply voltage VDD among those illustrated in FIG. 3C. Switches SW1 and SW2 are simplified forms of the reset operations of the pixels 100. In other words, when the SW1 and SW2 are brought into a conductive state, the input nodes of the A/D converting units 200 and the input nodes for the ramp signal RAMP of the comparing units 7, and potentials of the capacitive elements 16 are reset. It is assumed here that current i1+i2 is fed to the parasitic resistance R1. The potential of the node which is electrically connected to the switch SW1 of the parasitic capacitance CP1 is a potential V1. The potential of the node which is electrically connected to the switch SW2 of the parasitic capacitance CP2 is a potential V2.

Figure 4B:
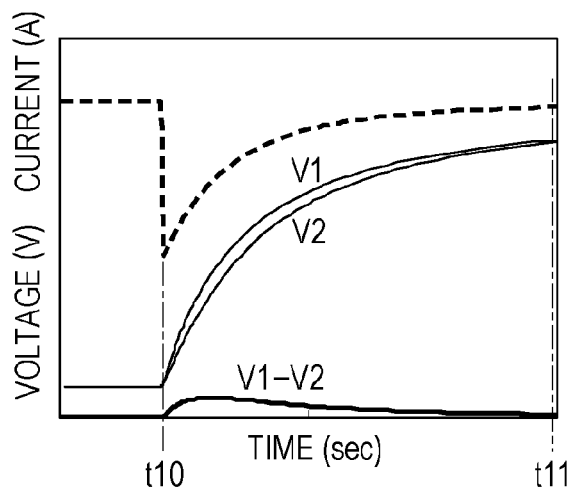

FIG. 4B illustrates changes of the potentials V1 and V2 of the switches SW1 and SW2 when the switches SW1 and SW2 are brought into a conductive state simultaneously with a time t10 illustrated in FIG. 4B and current fed to the power supply line which supplies a power supply voltage VDD. Referring to FIG. 4B, the potentials V1 and V2 are equal before the time t10. When the switch SW1 is brought into a conductive state, the current i1 is fed to between the parasitic capacitance CP1 and the power supply line, as illustrated in FIG. 4A. When the switch SW2 is brought into a conductive state, the current i2 is fed to between the parasitic capacitance CP2 and the power supply line, as illustrated in FIG. 4A. The current i2 has a lower value than that of the current i1 because it is influenced by the parasitic resistance R2. In other words, the parasitic capacitance CP2 has a higher time constant than that of the parasitic capacitance CP1.

Thus, as illustrated in FIG. 4B, the potential V2 has a smaller changing quantity per unit time than that of the potential V1. In other words, during a period from the time t10 to the time t11, the potential V1 and the potential V2 have different values.

As seen from the period after the time t11, the potential difference V1−V2 reaches 0 after a lapse of a sufficient time from the start of resetting. However, there still is a potential difference V1−V2 when the period from the time t10 to the time t11 is not sufficiently long. Providing a period from the time t10 to the time t11 may prevent an increase of the speed of the imaging apparatus.

The time required for resetting the parasitic capacitances CP of the pixels 100 increases as the distance from the potential supply unit 300 increases, as described above. It is assumed that the resets for the pixels 100 connected commonly to one power supply line start simultaneously and the resets ends before the reset voltages for the pixels 100 are stabilized. In this case, as the distance between the pixel 100 and the potential supply unit 300 increases, the changing quantity of the potential of the parasitic capacitance CP of the pixel 100 until the end of the reset start decreases. After that, when an image is generated by using an electric signal generated by the photoelectric conversion unit 9, the image may have shading based on a potential distribution of the parasitic capacitance CP.

Figure 4C:
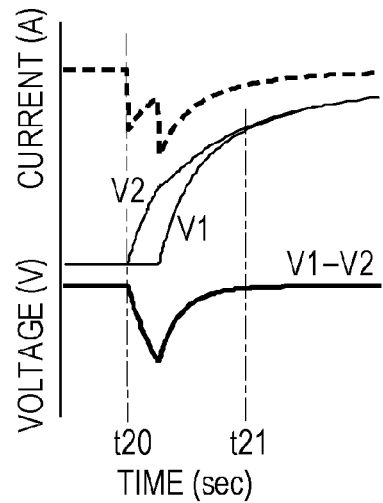

FIG. 4C illustrates changes of the potentials V1 and V2 and current fed to a power supply line which supplies a power supply voltage VDD in a case where the switch SW2 is brought into a conductive state and the switch SW1 is then brought into a conductive state. At a time t20, the switch SW20 is brought into a conductive state. Thus, the reset of the parasitic capacitance CP2 having a larger time constant than that of the parasitic capacitance CP1 is started earlier than the parasitic capacitance CP1. The current i2 is fed to the parasitic resistance R1. According to the timing described with reference to FIG. 4B, the current i1+i2 is fed to the parasitic resistance R1. Thus, the amount of current fed to the power supply line is smaller, compared with the case where the switches SW1 and SW2 are brought into a conductive state simultaneously. Therefore, the power supply voltage VDD has a smaller voltage drop. As a result the parasitic capacitance CP2 is reset with a higher voltage than the case where the switches SW1 and SW2 are brought into a conductive state simultaneously, which may reduce the time required for the reset.

After that, the switch SW1 is brought into a conductive state, and the reset of the parasitic capacitance CP1 is started. The parasitic capacitance CP1 has a smaller time constant than that of the parasitic capacitance CP2. Thus, when the switches SW1 and SW2 are brought into a conductive state simultaneously, the change of the potential V1 per unit time is larger than that of the potential V2. Therefore, the difference between the potentials V1 and V2 decreases with a lapse of time. At a time t21, the difference between the potentials V1 and V2 reaches substantially 0. The variations of the reset voltage of each of the pixels 100 may be reduced as far as the difference between the potentials V1 and V2 is substantially equal to 0 even before the potentials of the parasitic capacitances CP1 and CP2 are stabilized. As a result, an image generated based on an electric signal generated by the photoelectric conversion unit 9 does not have shading easily.

The period from the time t20 to the time t21 illustrated in FIG. 4C is shorter than the period from the time t10 to the time t11 illustrated in FIG. 4B. Shading may not occur easily on the resulting image even when it is difficult to provide a sufficient reset period for stabilization of the potentials of the parasitic capacitances CP1 and CP2.

According to this exemplary embodiment, during a period when the signal supplying unit 3 changes the signal PRES to an H level, the vertical scanning circuit 2 changes the signal PTX to an L level. Alternatively, during a period when the signal supplying unit 3 changes the signals PRES and RRES to an H level, the vertical scanning circuit 2 may change the signal PTX to an H level to reset the photoelectric conversion unit 9. In this case, the timing for resetting the potentials of the photoelectric conversion unit 9 may be differentiated between the plurality of pixels 100 from each other. This may reduce fluctuations of the potential of the power supply voltage VDD, compared with the case where the potentials of the photoelectric conversion units 9 in the plurality of pixels 100 are reset simultaneously.

In the imaging apparatus according to this exemplary embodiment, the vertical scanning circuit 2 may change the signal PTX to be output to all of the pixels 100 to an H level simultaneously, and the electric signals generated by the photoelectric conversion units 9 may be transferred to the input nodes of the A/D converting units 200 simultaneously. This allows a global electronic shutter operation to be performed. A control unit causing the imaging apparatus to perform a global electronic shutter operation includes the vertical scanning circuit 2 and the signal supplying unit 3 according to this exemplary embodiment.

Each of the block 1 and the block 2 described with reference to the FIG. 1A according to this exemplary embodiment may have at least one pixel 100. In other words, in the first pixel 100 in the block 1 and in the second pixel 100 in the block 2 in the imaging apparatus according to this exemplary embodiment, the electric signals generated by the photoelectric conversion units 9 may be transferred to the control nodes of the transistors 12 simultaneously. The reset of the control nodes of the transistors 12 may be started at different timing from each other between the first pixel 100 and the second pixel 200.

According to this exemplary embodiment, A/D conversion using a ramp signal RAMP is applied. However, this exemplary embodiment is not limited thereto. An alternative A/D converter having a comparator may be a successive comparison type or a pipe line type A/D converter, for example. In this case, the reset may be started at different timing between blocks.

Figure 5:
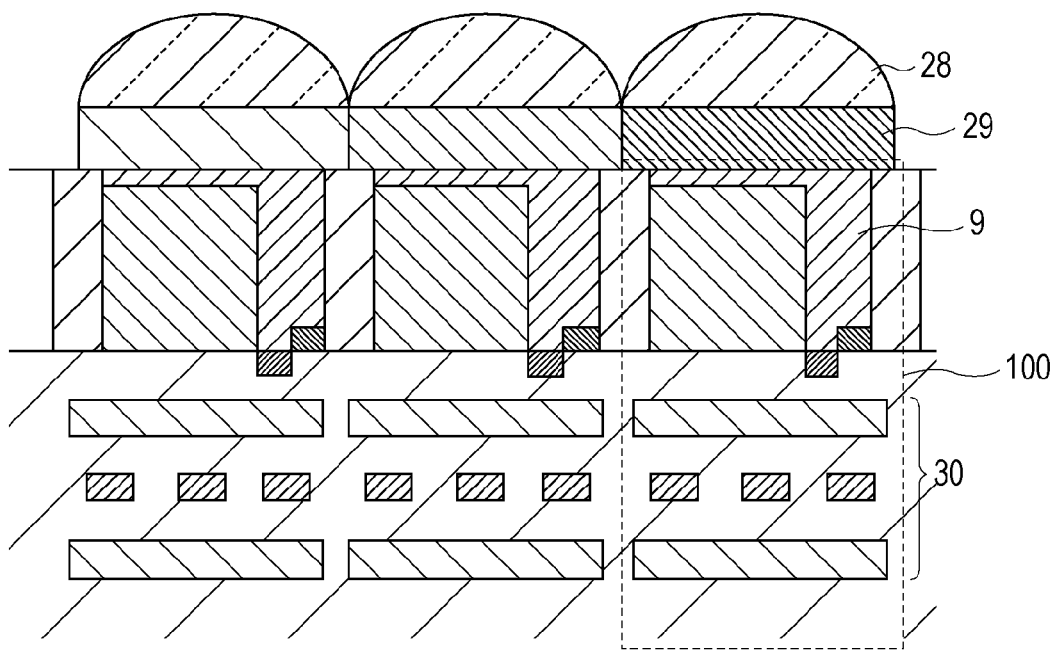
FIG. 5 is a section view illustrating an example of a configuration of an imaging apparatus.

A what-is called backside illumination type imaging apparatus is an example of the imaging apparatus in which each of the pixels 100 has the comparing unit 7 and the memory unit 8. FIG. 5 illustrates a section view of the pixels 100 in an example of such a backside illumination type imaging apparatus. Light incident on a microlens 28 enters to the photoelectric conversion unit 9 through a color filter 29. A wiring layer 30 is provided on the opposite side of the microlens 28, viewed from the photoelectric conversion unit 9. The wiring layer 30 includes the A/D converting unit 200. In other words, the photoelectric conversion unit 9 is provided between the microlens 28 and the A/D converting unit 200. The backside illumination type imaging apparatus may include pixels 100 each having the comparing unit 7 and memory unit 8 and also may suppress the reduction of the light-receiving area of the photoelectric conversion units 9.

Having described the configuration in which each block has a plurality of pixels 100, one block may include one pixel 100.

According to this exemplary embodiment, the A/D converting unit 200 is provided in each of the pixels 100, and the signal supplying unit 3 supplies signals PRES and RRES to the plurality of pixels 100. This exemplary embodiment is not limited thereto, but a pixel array having pixels 100 having the A/D converting units 200 arranged in a matrix form may be provided externally. For example, this embodiment may be implemented by using column parallel-type A/D converting units 200 in which an A/D converting unit 200 is provided for each column of the pixels 100.

According to this exemplary embodiment, an imaging apparatus having the photoelectric conversion units 9 has been described as an example of a converting unit which generates an electric signal based on an incident electromagnetic wave. Alternatively, the converting unit may be a converting unit which converts an electromagnetic wave such as an X-ray, an ultraviolet radiation, and an infrared radiation to an electric signal.

Second Exemplary Embodiment

An imaging apparatus according to a second exemplary embodiment will be described with focus on differences from the first exemplary embodiment. In the imaging apparatus according to this exemplary embodiment, the signal supplying unit 3 generates a reset signal based on a logical AND operation of a plurality of signals having different amounts of delay from each other.

According to this exemplary embodiment, a parasitic resistance of a signal line which transmit a signal RRES is used to differentiate the timing for resetting the input nodes for a ramp signal RAMP and the capacitive element 16 between a plurality of comparing units 7.

Figure 6:
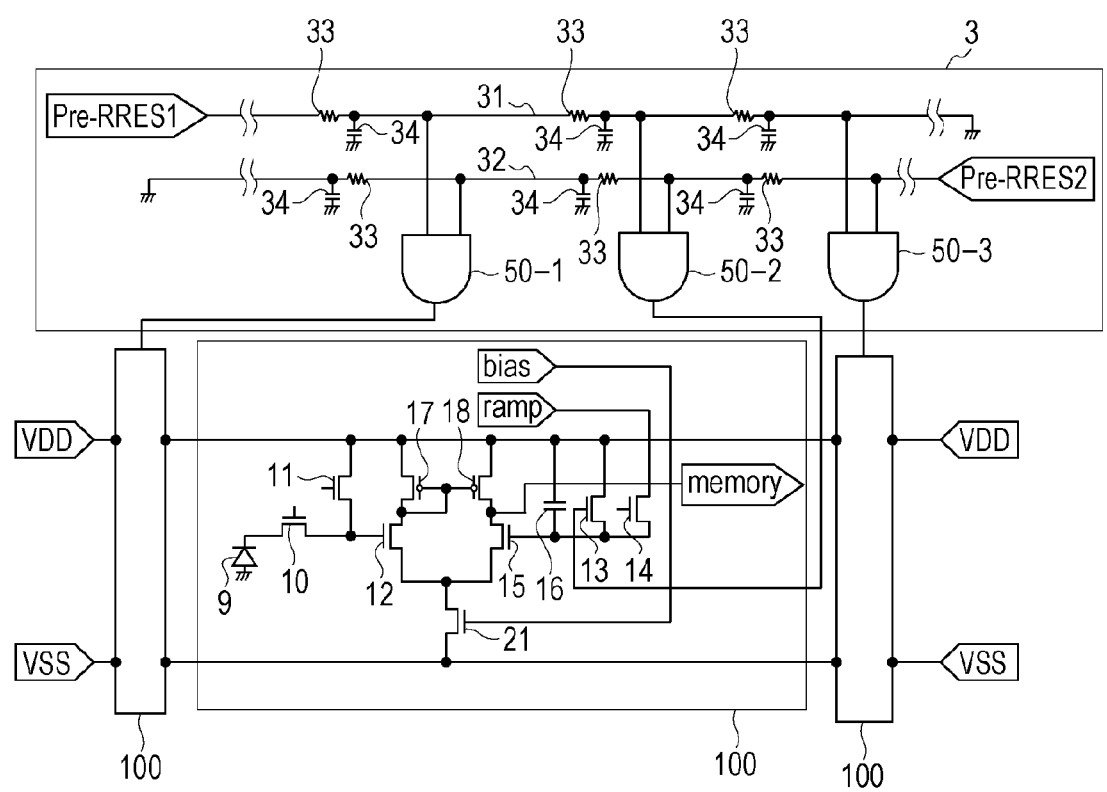
FIG. 6 is a schematic diagram illustrating examples of a signal supplying unit and a pixel.

FIG. 6 illustrates pixels 100 and signal lines which transmit signals Pre-RRES1 and Pre-RRES2 according to this exemplary embodiment. A first signal line 31 receives the signal Pre-RRES1 from one end portion of the imaging apparatus, and a second signal line 32 receives a signal Pre-RRES2 from an end portion opposite to the one end portion of the imaging apparatus. The signal values of the signal Pre-RRES1 and signal Pre-RRES2 changes at a same time.

In the first signal line 31 and second signal line 32, a parasitic resistance 33 and a parasitic capacitance 34 present in the signal lines delay the signals Pre-RRES1 and Pre-RRES2, respectively. In other words, in the first signal line 31, the amount of delay of the signal Pre-RRES1 increases as the length of the electrical path from a source of the signal Pre-RRES1 increases. This means that the amount of delay of the signal Pre-RRES1 increases from the left to the right in FIG. 6. On the other hand, the amount of delay of the signal Pre-RRES2 increases from the right to the left in FIG. 6 in the second signal line 32.

The amounts of delay of the signals Pre-RRES1 and Pre-RRES2 may be adjusted by using the parasitic resistance 33 of the signal lines. The signal adjustment using the parasitic resistance 33 includes changing the wire thickness of the signal lines, for example. The signals RRES from the first signal line 31 and second signal line 32 which are increasingly delayed in different directions from each other are output to AND circuits 50. The AND circuits 50 outputs signals RRES. Each of the signal PRES is generated based on a logical sum of a plurality of signals having different amounts of delay from each other.

It is assumed here that a resistance value of the parasitic resistance 33 is equal to a capacitance value of the parasitic capacitance 34 in the first signal line 31 and the second signal line 32. In this case, an output from the AND circuit 50 with a smallest difference between the length of the electrical path from a source of the signal Pre-RRES1 and the length of the electrical path from a source of the signal Pre-RRES2 is changed to an H level first. For example, it is assumed that the first signal line 31 and the second signal line 32 have exactly a same length. In this case, an output from the AND circuit 50 to which the signals Pre-RRES1 and Pre-RRES2 are output from the centers of the first signal line 31 and second signal line 32 is changed to an H level first among all of the AND circuits 50. Referring to FIG. 6, an output of the AND circuit 50-2 is changed to an H level first among the AND circuits 50.

After that, outputs of the AND circuits 50 are changed to an H level sequentially from the centers of the first signal line 31 and the second signal line 32 to one end portion and the other end portion. In other words, referring to FIG. 6, after an output of the AND circuit 50-1 is changed to an H level first, and outputs of the AND circuits 50-1 and 50-3 are changed to an H level substantially at a same time.

In the imaging apparatus according to this exemplary embodiment, the parasitic resistance 33 and parasitic capacitance 34 of a signal line which transmits a signal RRES may be used to differentiate the time for changing the signal RRES from an L level to an H level between a plurality of pixels 100. Thus, in the imaging apparatus of this exemplary embodiment, the amount of current to be fed simultaneously to a power supply line which supplies a power supply voltage VDD may be reduced, compared with a case where signals RRES are changed from an L level to an H level in all pixels simultaneously. Therefore, the fluctuations of reset voltage to the input node for the ramp signal RAMP of the comparing unit 7 and the capacitive element 16 may be reduced, which may further reduce deterioration of accuracy of A/D conversion.

According to this exemplary embodiment, the imaging apparatus having the AND circuits 50 which generate signals RRES has been described. As another example, the imaging apparatus may have an AND circuit which generates a signal PRES. Also in this case, the signal supplying unit 3 may generate a signal PRES based on a logical AND operation of a plurality of signals having different amounts of delay from each other.

Third Exemplary Embodiment

An imaging apparatus according to a third exemplary embodiment will be described with focus of differences from the second exemplary embodiment.

Figure 7:
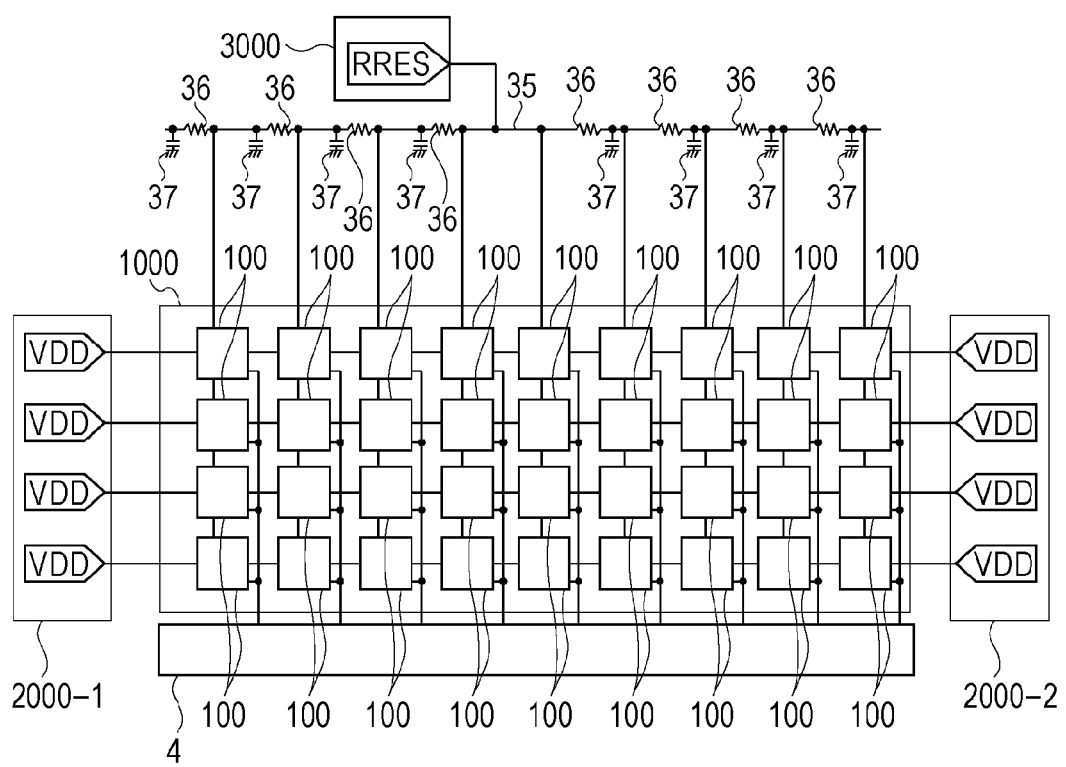
FIG. 7 is a schematic diagram illustrating examples of a signal supplying unit and a pixel.

FIG. 7 illustrates a pixel array 1000 having pixels 100 arranged in a matrix form, a signal supplying unit 3000 configured to supply a signal RRES, a signal line 35 configured to transmit the signal RRES and power supply units 2000-1 and 2000-2.

Each of the power supply units 2000-1 and 2000-2 has one end portion of the pixel array and an end portion on the opposite side of the one end portion.

In the imaging apparatus of this exemplary embodiment, the shortest electrical path is provided from the signal supplying unit 3000 to the pixels 100 in a column having the longest electrical path to the power supply units 2000-1 and 2000-2 among the pixels 100 in all columns.

The signal line 35 configured to transmit a signal RRES has a parasitic resistance 36 and a parasitic capacitance 37. Thus, as the length of the electrical path from the signal supplying unit 3000 increases, the amount of delay of the signal RRES increases. Because of this, when the signal supplying unit 3000 changes the signal RRES to an H level, the pixels 100 in a column having the longest electrical path from the power supply units 2000-1 and 2000-2 have signals RRES changed to an H level first among the pixels 100 in all columns. After that, the signals RRES are changed to an H level in order from a column having a shortest electrical path to a column having a longest electrical path from the signal supplying unit 3000. Also among the pixels 100 in one column, signals RRES are changed to an H level in order from the pixel 100 having a shortest electrical path to the pixel 100 having a longest electrical path from the signal supplying unit 3000. The power supply unit 2000 supplies a power supply voltage VDD to each row. In one row to which a common power supply voltage VDD is supplied, the signals RRES are changed to an H level in order from the pixel 100 having a longest electrical path to the pixel 100 having a shortest electrical path from the power supply unit 2000. Therefore, the imaging apparatus of this exemplary embodiment may provide the same effect as that of the imaging apparatus of the second exemplary embodiment.

Fourth Exemplary Embodiment

An imaging apparatus according to a fourth exemplary embodiment will be described with focus on differences from the first exemplary embodiment.

Figure 8:
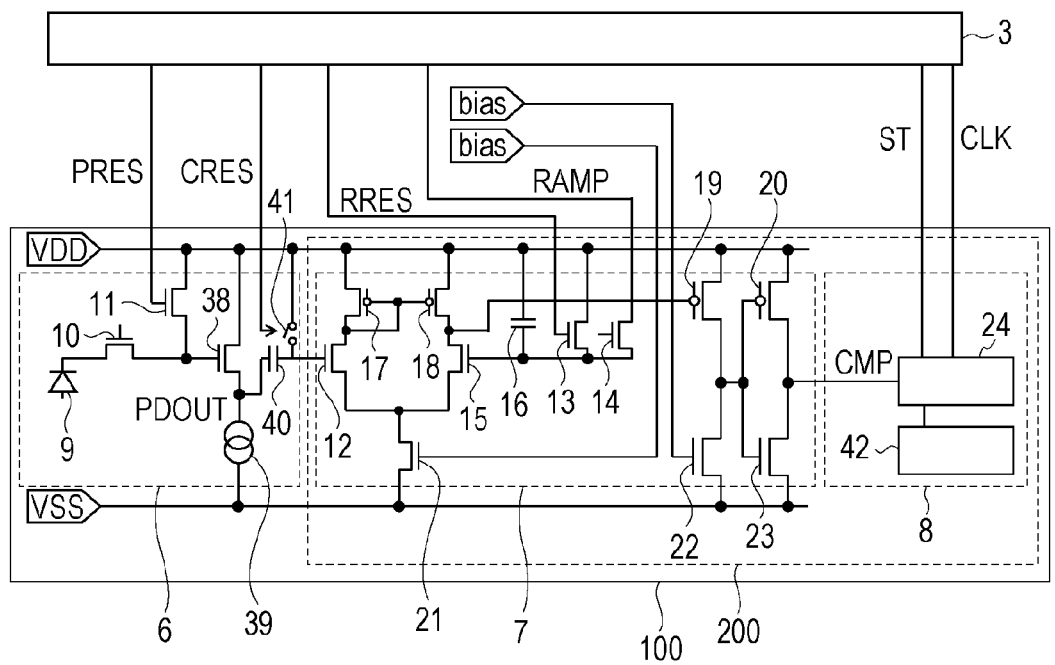
FIG. 8 is a schematic diagram illustrating examples of a signal supplying unit and a pixel.

FIG. 8 illustrates a configuration of the imaging apparatus of this exemplary embodiment.

According to this exemplary embodiment, pixels 100 perform correlated double sampling (hereinafter, called CDS).

A plurality of blocks having pixels 100 may be arranged as illustrated in FIG. 1A.

FIG. 8 illustrates an example of a configuration of a pixel 100 of this exemplary embodiment. In FIG. 8, like numbers to those in FIG. 1B refer to like members having like functions to those of the pixel 100 in FIG. 1B according to the first exemplary embodiment.

The pixel 100 exemplarily illustrated in FIG. 8 is different from the pixel 100 exemplarily illustrated in FIG. 1B in that there are provided a transistor 38, a current source 39 configured to supply current to the transistor 38 and a capacitive element 40 between the transistor 38 and the transistor 12. The pixel 100 exemplarily illustrated in FIG. 8 is further different from the pixel 100 exemplarily illustrated in FIG. 1B in that a switch 41 is provided which is configured to reset the potential of a node closer to the transistor 12 of the capacitive element 40. The switch 41 is controlled with a reset signal CRES supplied by the vertical scanning circuit 2. The pixel 100 exemplarily illustrated in FIG. 8 is further different from the pixel 100 exemplarily illustrated in FIG. 1B in that an N memory 42 configured to hold a count signal based on a noise signal is provided in the memory unit 8. The other configurations are similar to those of the pixel 100 exemplarily illustrated in FIG. 1B. The transistor 38 is an amplifying unit configured to amplify an electric signal generated by a converting unit and output it to an input unit of the A/D converting unit 200. The signal holding unit according to the claims corresponds to the input node of the transistor 38 according to this exemplary embodiment.

Figure 9:
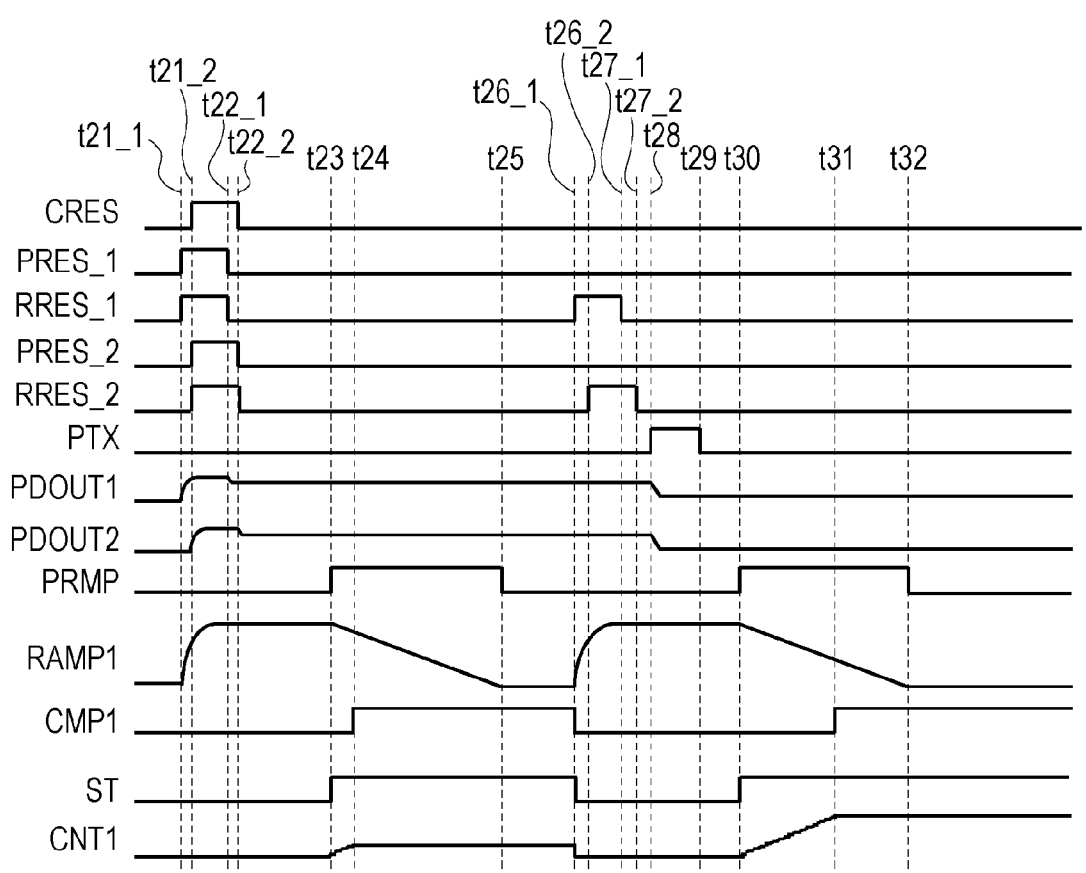
FIG. 9 is a timing chart illustrating examples of operations performed by an imaging apparatus.

FIG. 9 is a timing chart illustrating operations performed by an imaging apparatus having the pixel 100 exemplarily illustrated in FIG. 8.

During a period from a time t21_1 to a time t22_1, the signal supplying unit 3 changes a reset signal PRES_1 to be supplied to pixels 100 belonging to the block 1 to an H level. This resets the potential of the input nodes of the transistors 38 in the pixels 100 belonging to the block 1. Output voltages PDOUT_1 of the transistors 38 in the pixels 100 belonging to the block 1 are reset.

During the period from the time t21_1 to the time t22_1, the signal supplying unit 3 changes the signal RRES_1 to an H level. This resets the potentials of control nodes of the transistors 15 and the capacitive elements 16 in the pixels 100 belonging to the block 1. Thus, the potentials of ramp signals RAMP in the pixels 100 belonging to the block 1 are reset.

At the time t21_1, the signal supplying unit 3 changes a signal CRES to an H level. This brings the switches 41 in the pixels 100 belonging to the block 1 and block 2 into a conductive state. Thus, the potentials of the input nodes of the transistors 12 are reset.

After that, at the time t22_1, the signal CRES is changed to an L level. Thus, the switches 41 are brought into a non-conductive state. Therefore, the capacitive elements 40 in the pixels 100 belonging to the block 1 and block 2 hold signals output from the transistors 38 when the signal RRES is changed from an H level to an L level.

During the period from a time t21_2 to a time t22_2, the signal supplying unit 3 changes the reset signal PRES_2 to be supplied to the pixels 100 belonging to the block 2 to an H level. This resets the potentials of the input nodes of the transistors 38 in the pixels 100 belonging to the block 2. Thus, output voltages PDOUT_2 of the transistors 38 in the pixels 100 belonging to the block 2 are reset.

During the period from the time t21_2 to the time t22_2, the signal RRES_2 is changed to an H level. This resets the potentials of the control nodes of the transistors 15 and the capacitive elements 16 in the pixels 100 belonging to the block 2. Thus, the potentials of the ramp signals RAMP in the pixels 100 belonging to the block 2 are reset.

The signal supplying unit 3 changes a signal CRES (not illustrated) to be output to the pixels 100 belonging to the block 2 to an H level at the time t21_2 and to an L level at the time t22_2. Thus, the capacitive elements 40 in the pixels 100 belonging to the block 2 hold signals output from the transistors 38 at the time t22_2.

At a time t23, the signal supplying unit 3 changes the signal PRMP to an H level so that the potential depending on time of the ramp signal RAMP starts changing. The signal supplying unit 3 changes the signal ST to an H level at the time t23 so that the counters 24 start counting clock signals CLK.

At a time t24, the magnitude relationship between the potentials of the control nodes of the transistors 12 and the potentials of the control nodes of the transistors 15 is reversed. Thus, the signal value of the comparison result signal CMP changes. The counters 24 hold the count signal at that time.

At a time t25, the signal supplying unit 3 changes the signal PRMP to an L level so that the change of the potential depending on time of the ramp signal RAMP stops. The counters 24 output the held count signals to the memories 42. The signal held by each of the memories 42 will be called a digital N signal, hereinafter. The digital N signal is a digital signal based on the potential of the input node of the reset transistor 38.

The operations relating to the period from the time t23 to the time t25 have been described with respect to the pixels 100 belonging to the block 1. The operations relating to the period from the time t23 to the time t25 may be performed in the pixels 100 belonging to the block 1 in same timing as that of the operations in the pixels 100 belonging to the block 2.

Next, each of the pixels 100 generates a digital signal based on an electric signal generated by the photoelectric conversion unit 9 based on incident light.

At a time t26_1, the signal supplying unit 3 changes the signal ST to an L level so that the count signal is reset.

During a period from the time t26_1 to a time t27_1, the signal supplying unit 3 changes the signal RRES_1 to an H level so that the potentials of the control nodes of the transistors 15 and the capacitive elements 16 in the pixels 100 belonging to the block 1 are reset. Thus, the potential of the ramp signal RAMP to the pixels 100 belonging to the block 1 is reset.

During a period from a time t26_2 to a time t27_2, the signal supplying unit 3 changes the signal RRES_2 to an H level so that the potentials of the control nodes of the transistors 15 and the capacitive elements 16 in the pixels 100 belonging to the block 2 are reset. Thus, the potential of the ramp signal RAMP to the pixels 100 belonging to the block 2 is reset.

The operations which will be described below are common in the pixels 100 belonging to the block 1 and block 2.

Next, during a period from time t28 to a time t29, the signal supplying unit 3 changes the signal PTX to an H level. Thus, an electric signal generated by the photoelectric conversion unit 9 is transferred to the input node of the transistor 38. The transistor 38 outputs a signal based on a potential of the input node. The signal will be called a photoelectric conversion signal.

At a time t30, the signal supplying unit 3 changes a control signal PRMP to the transistor 14 to an H level so that a change of the potential depending on time of the ramp signal RAMP starts. The signal supplying unit 3 changes the signal ST to an H level at the time t29 so that the counter 24 starts counting clock signals CLK.

At a time t31, the magnitude relationship between the potential of the control node of the transistor 12 and the potential of the control node of the transistor 15 is reversed. The counter 24 holds the count signal at that time. The count signal held in the counter 24 will be called a digital S signal.

At a time t32, the signal supplying unit 3 changes the signal PRMP to an L level so that the change of the potential depending on time of the ramp signal RAMP stops.

The vertical scanning circuit 2 causes the pixels 100 in rows to output the digital N signals held in the memories 42 and the digital S signals held in the counters 24 to the horizontal scanning circuit 4. The horizontal scanning circuit 4 sequentially outputs the digital S signals and the digital N signals to the external output unit 5. The external output unit 5 outputs a signal indicative of a difference between the digital S signals and the digital N signals externally to the imaging apparatus.

Because the imaging apparatus of this exemplary embodiment externally outputs a signal acquired by subtracting a digital N signal that is a noise component from a digital S signal, a digital signal excluding the noise component may be output.

The imaging apparatus of this exemplary embodiment changes the signals PRES and RRES from an L level to an H level at different timing between blocks. This may provide the same effect as that of the first exemplary embodiment.

In the imaging apparatus of this exemplary embodiment, the external output unit 5 generates a signal indicative of a difference between a digital S signal and a digital N signal. As another example, the pixel 100 or horizontal scanning circuit 4 may generate a signal indicative of a difference between a digital S signal and a digital N signal.

The imaging apparatus of this exemplary embodiment has been described in which each of the pixels 100 has the memory 42. As another example, pixel column of the pixel array 1000 may include the memory 42. In this case, the memory 42 in each column holds digital N signals sequentially output from the pixels 100 of the corresponding column. The horizontal scanning circuit 4 scans the memories 42 in columns so that the memories 42 in the columns sequentially output digital N signals to the external output unit 5.

According to this exemplary embodiment, the signal CRES is a common signal to the block 1 and block 2. However, in the imaging apparatus of this exemplary embodiment, the signal CRES may be changed from an L level to an H level at different timing between blocks, like the signals PRES and RRES. Alternatively, in the imaging apparatus of this exemplary embodiment, the signals PRES, RRES, and CRES may be changed from an L level to an H level at different timing within one block.

Fifth Exemplary Embodiment

An exemplary embodiment will be described in which the imaging apparatus according to any one of the first exemplary embodiment to fourth exemplary embodiment is applied to an imaging system. The imaging system may be a digital still camera, a digital camcorder, a surveillance camera or the like. FIG. 10 is a block diagram illustrating a case in which the imaging apparatus is applied to a digital still camera that is an example of the imaging system.

Referring to FIG. 10, the imaging system includes a lens 102 configured to allow an imaging apparatus 104 to focus on an optical image of an object, a barrier 101 for protection of the lens 102, and a diaphragm 103 for adjustment of the quantity of light having passed through the lens 102. The imaging system further includes a signal processing unit 105 configured to process a signal output from the imaging apparatus 104.

The signal processing unit 105 has a digital signal processing unit configured to perform operations including performing a correction and a compression as required on a signal output from the imaging apparatus 104 and outputting the resulting signal.

The imaging system further includes a buffer memory unit 106 configured to temporarily store image data and a storage medium control unit 110 usable for recording or reading to or from a recording medium. The imaging system has a detachably mounted recording medium 111 such as a semiconductor memory to or from which image data is recorded or read. The imaging system further includes an external interface unit 107 usable for communication with an external computer, for example, an overall control/calculation unit 109 configured to control calculations and the entire digital still camera over all, and the imaging apparatus 104. The imaging system further includes a timing generation unit 108 configured to output a timing signal in the signal processing unit 105. In this case, such a timing signal may be input externally, and the imaging system may include at least the imaging apparatus 104 and the signal processing unit 105 configured to process a signal output from the imaging apparatus 104.

The aforementioned technologies allow reduction of fluctuations of reset voltage that occur when pixels are reset.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2013-111840, filed May 28, 2013, which is hereby incorporated by reference herein in its entirety.

What is claimed is:

1. An imaging apparatus including a plurality of pixels including at least a first pixel and a second pixel, the first pixel and the second pixel each having
    a converting unit configured to generate an electric signal based on an incident electromagnetic wave;
    an input unit configured to receive the electric signal from the converting unit;
    a reference signal input unit configured to receive a reference signal; and
    an A/D (analog to digital) converting unit configured to convert the electric signal to a digital signal based on a result of comparison between a potential of the input unit and a potential of the reference signal input unit, wherein a reset period for resetting at least one of a potential of the converting unit, a potential of the input unit, and a potential of the reference signal input unit is started for the first pixel and the second pixel at different timing from each other; and
    timing for inputting the electric signal from the converting unit to the input unit is synchronized between the first pixel and the second pixel.

2. The imaging apparatus according to claim 1, wherein the imaging apparatus includes a plurality of blocks each having the plurality of pixels; and
    the reset period starts for the plurality of blocks at different timing from each other.

3. The imaging apparatus according to claim 1, wherein the A/D converting unit further generates a digital signal based on a potential of the input unit reset.

4. The imaging apparatus according to claim 1, wherein the electric signal to be input to the input unit is a signal acquired by amplifying the electric signal generated by the converting unit.

5. An imaging system comprising:
    the imaging apparatus according to claim 1; and
    a signal processing unit configured to generate an image based on the digital signal output from the imaging apparatus.

6. An imaging apparatus including a plurality of pixels including at least a first pixel and a second pixel, the first pixel and the second pixel each having
    a converting unit configured to generate an electric signal based on an incident electromagnetic wave;
    a signal holding unit configured to hold the electric signal generated by the converting unit;
    an input unit configured to receive an electric signal acquired by amplifying the electric signal hold by the signal holding unit;
    a reference signal input unit configured to receive a reference signal; and
    an A/D (analog to digital) converting unit configured to convert the electric signal to a digital signal based on a result of comparison between a potential of the input unit and a potential of the reference signal input unit, wherein a reset period for resetting at least one of a potential of the converting unit, a potential of the input unit, a potential of the reference signal input unit, and the potential of the signal holding unit is started for the first pixel and the second pixel at different timing from each other; and
    timing for inputting the electric signal from the converting unit to the input unit is synchronized between the first pixel and the second pixel.

7. An imaging apparatus including a plurality of pixels including at least a first pixel and a second pixel, the first pixel and the second pixel each having a converting unit configured to generate an electric signal based on an incident electromagnetic wave; an input unit configured to receive the electric signal from the converting unit; a reference signal input unit configured to receive a reference signal; and an A/D (analog to digital) converting unit configured to convert the electric signal to a digital signal based on a result of comparison between a potential of the input unit and a potential of the reference signal input unit, and; a potential supply unit configured to supply a common reset potential to the plurality of pixels; a first electrical path configured to supply the reset potential to the first pixel from the potential supply unit; and a second electrical path configured to supply the reset potential to the second pixel from the potential supply unit, the second electrical path being longer than the first electrical path, wherein a reset period for resetting at least one of a potential of the converting unit, a potential of the input unit, and a potential of the reference signal input unit is started for the second pixel earlier than the first pixel.

8. The imaging apparatus according to claim 7, wherein the imaging apparatus includes a plurality of blocks each having the plurality of pixels; and
    the reset period starts for the plurality of blocks at different timing from each other.

9. The imaging apparatus according to claim 7, wherein the A/D converting unit further generates a digital signal based on a potential of the input unit reset.

10. The imaging apparatus according to claim 7, wherein the electric signal to be input to the input unit is a signal acquired by amplifying the electric signal generated by the converting unit.

11. An imaging apparatus including
    a plurality of pixels including at least a first pixel and a second pixel, the first pixel and the second pixel each having a converting unit configured to generate an electric signal based on an incident electromagnetic wave; a signal holding unit configured to hold the electric signal generated by the converting unit; an input unit configured to receive an electric signal acquired by amplifying the electric signal hold by the signal holding unit; a reference signal input unit configured to receive a reference signal; and an A/D (analog to digital) converting unit configured to convert the electric signal to a digital signal based on a result of comparison between a potential of the input unit and a potential of the reference signal input unit, and; a potential supply unit configured to supply a common reset potential to the plurality of pixels; a first electrical path configured to supply the reset potential to the first pixel from the potential supply unit; and a second electrical path configured to supply the reset potential to the second pixel from the potential supply unit, the second electrical path being longer than the first electrical path, wherein a reset period for resetting at least one of a potential of the converting unit, a potential of the input unit, a potential of the reference signal input unit, and the potential of the signal holding unit is started for the second pixel earlier than the first pixel.

12. An imaging apparatus including a plurality of pixels including at least a first pixel and a second pixel, the first pixel and the second pixel each having a converting unit configured to generate an electric signal based on an incident electromagnetic wave; an input unit configured to receive the electric signal from the converting unit; a reference signal input unit configured to receive a reference signal; and an A/D (analog to digital) converting unit configured to convert the electric signal to a digital signal based on a result of comparison between a potential of the input unit and a potential of the reference signal input unit; and a potential supply unit configured to supply a common reset potential to the plurality of pixels; a first electrical path configured to supply the reset potential to the first pixel from the potential supply unit; and a second electrical path configured to supply the reset potential to the second pixel from the potential supply unit, a resistance of the second electrical path being larger than a resistance of the first electrical path, wherein a reset period for resetting at least one of a potential of the converting unit, a potential of the input unit, and a potential of the reference signal input unit is started for the second pixel earlier than the first pixel.

13. The imaging apparatus according to claim 12, wherein the imaging apparatus includes a plurality of blocks each having the plurality of pixels; and
the reset period starts for the plurality of blocks at different timing from each other.

14. The imaging apparatus according to claim 12, wherein the A/D converting unit further generates a digital signal based on a potential of the input unit reset.

15. The imaging apparatus according to claim 12, wherein the electric signal to be input to the input unit is a signal acquired by amplifying the electric signal generated by the converting unit.

16. An imaging apparatus including a plurality of pixels including at least a first pixel and a second pixel, the first pixel and the second pixel each having a converting unit configured to generate an electric signal based on an incident electromagnetic wave;
a signal holding unit configured to hold the electric signal generated by the converting unit;
an input unit configured to receive an electric signal acquired by amplifying the electric signal hold by the signal holding unit; a reference signal input unit configured to receive a reference signal; and an A/D (analog to digital) converting unit configured to convert the electric signal to a digital signal based on a result of comparison between a potential of the input unit and a potential of the reference signal input unit, and; a potential supply unit configured to supply a common reset potential to the plurality of pixels; a first electrical path configured to supply the reset potential to the first pixel from the potential supply unit; and a second electrical path configured to supply the reset potential to the second pixel from the potential supply unit, a resistance of the second electrical path being larger than a resistance of the first electrical path, wherein a reset period for resetting at least one of a potential of the converting unit, a potential of the input unit, a potential of the reference signal input unit, and the potential of the signal holding unit is started for the second pixel earlier than the first pixel.

17. An imaging apparatus comprising: a plurality of pixels each having a converting unit configured to generate an electric signal based on an incident electromagnetic wave; an input unit configured to receive the electric signal from the converting unit; a reference signal input unit configured to receive a reference signal; and an A/D (analog to digital) converting unit configured to convert the electric signal to a digital signal based on a result of comparison between a potential of the input unit and a potential of the reference signal input unit, the plurality of pixels including at least a first pixel and a second pixel; and a control unit configured to differentiate a start of a reset period for resetting at least one of a potential of the converting unit, a potential of the input unit, and a potential of the reference signal input unit between the first pixel and the second pixel from each other and synchronize timing for inputting the electric signal from the converting unit to the input unit between the first pixel and the second pixel.

18. An imaging system comprising:
the imaging apparatus according to claim 17; and
a signal processing unit configured to generate an image based on the digital signal output from the imaging apparatus.

* * * * *